(12) United States Patent
Alsaif

(10) Patent No.: US 9,731,635 B2
(45) Date of Patent: *Aug. 15, 2017

(54) SAFETY DEVICE FOR VEHICLE SEATS

(71) Applicants: King Abdulaziz City for Science & Technology, Riyadh (SA); King Saud University, Riyadh (SA)

(72) Inventor: Khalid A Alsaif, Riyadh (SA)

(73) Assignees: King Abdulaziz City for Science and Technology, Riyadh (SA); Tagnia Robotics, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,417

(22) Filed: Apr. 11, 2016

(65) Prior Publication Data

US 2016/0264027 A1 Sep. 15, 2016

Related U.S. Application Data

(63) Continuation of application No. 14/644,121, filed on Mar. 10, 2015, now Pat. No. 9,327,624.

(51) Int. Cl.
B60N 2/42 (2006.01)
B60N 2/427 (2006.01)
B60N 2/44 (2006.01)
B60N 2/50 (2006.01)

(52) U.S. Cl.
CPC ......... B60N 2/4279 (2013.01); B60N 2/4228 (2013.01); B60N 2/42736 (2013.01); B60N 2/43 (2013.01); B60N 2/442 (2013.01); B60N 2/502 (2013.01); B60N 2/509 (2013.01); B60N 2002/4455 (2013.01)

(58) Field of Classification Search
CPC B60N 2/42736; B60N 2/4228; B60N 2/4279; B60N 2/43

See application file for complete search history.

(56) References Cited

U.S. PATENT DOCUMENTS

| | | | | | |
|---|---|---|---|---|---|
| 3,357,736 | A | * | 12/1967 | McCarthy | B60N 2/071 296/68.1 |
| 3,697,128 | A | * | 10/1972 | Strien | B60N 2/028 297/216.2 |
| 5,244,252 | A | * | 9/1993 | Serber | A47C 3/0255 297/216.19 |
| 5,314,206 | A | * | 5/1994 | Vollmer | B60N 2/4221 180/268 |
| 5,344,204 | A | * | 9/1994 | Liu | B60N 2/4221 296/68.1 |
| 6,334,648 | B1 | * | 1/2002 | Girsberger | B60N 2/4221 297/216.19 |
| 6,352,309 | B1 | * | 3/2002 | Beroth | B60N 2/4495 297/184.14 |

(Continued)

Primary Examiner — Drew J Brown
(74) Attorney, Agent, or Firm — SV Patent Service

(57) ABSTRACT

A vehicle safety device for reducing whiplash in a vehicle includes a curved guide configured to allow a seat to slide thereon, an impact sensor that can detect an impact on a rear end of the vehicle; and a locking mechanism that can allow the seat to slide on the curved guide when an impact is detected by the impact sensor. The locking mechanism can prevent the seat from moving relative to the curved guide when there is no impact detected by the impact sensor.

12 Claims, 9 Drawing Sheets

(56) References Cited

U.S. PATENT DOCUMENTS

| | | | |
|---|---|---|---|
| 7,523,888 B2 * | 4/2009 | Ferry | B60N 2/206 244/118.6 |
| 2002/0147535 A1 * | 10/2002 | Nikolov | B60N 2/4214 701/45 |
| 2005/0242634 A1 * | 11/2005 | Serber | B60N 2/0745 297/216.1 |
| 2006/0055214 A1 * | 3/2006 | Serber | B60N 2/0745 297/216.1 |

* cited by examiner

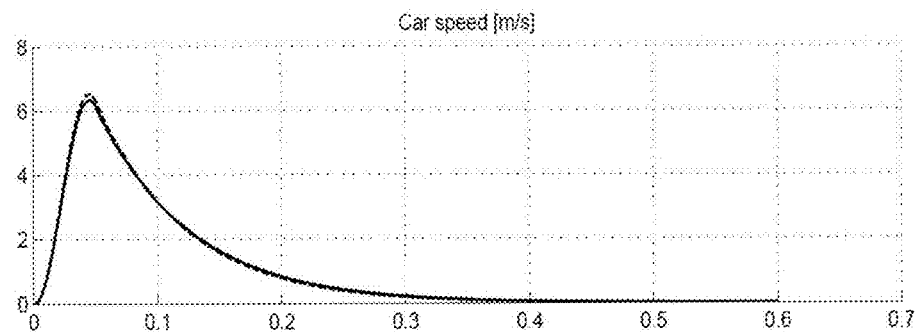
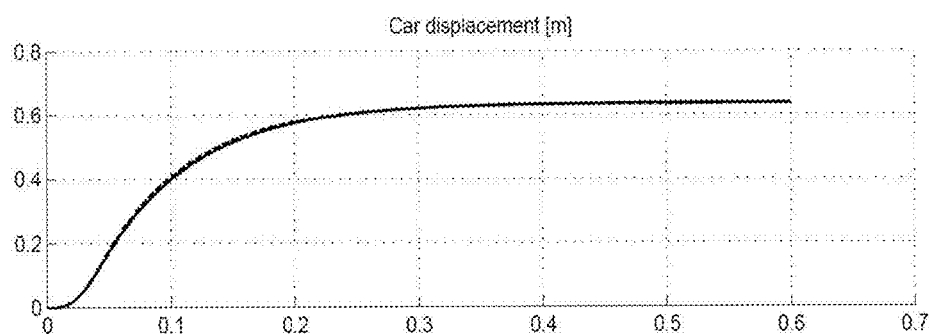
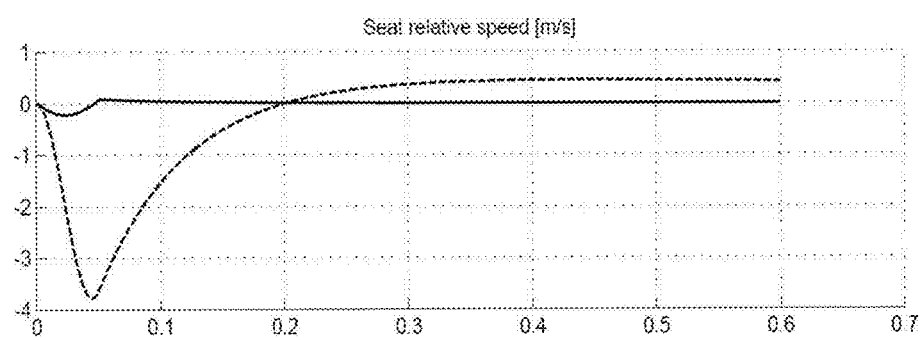
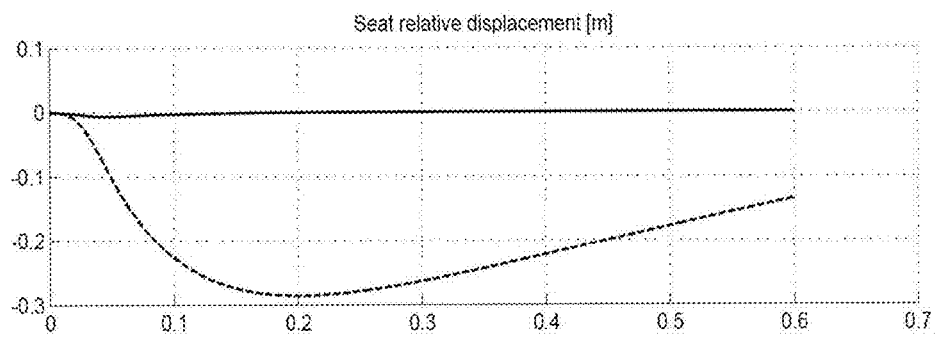

SAFETY DEVICE FOR VEHICLE SEATS

BACKGROUND OF THE INVENTION

The present application relates to vehicle technologies, and in particular, to technologies that assure safety of drivers and passengers in vehicles such as cars and buses.

Whiplash is a relatively common injury that occurs to a person's neck following a sudden acceleration-deceleration force, most commonly from motor vehicle accidents. The term "whiplash injury" describes damage to both the bone structures and soft tissues, while whiplash associated disorders (WAD) describes a more severe and chronic condition. Although whiplash is typically not a life threatening injury, it can lead to a prolonged period of partial disability. There are significant economic expenses related to whiplash that can reach a huge amount of money including: medical care, disability, sick leave, lost productivity, and litigation. Whiplash is most commonly caused by a motor vehicle accident in which a person is riding in a stationary or slow moving car that is struck by a vehicle from behind without notice. It is commonly thought the rear impact causes the passenger's head and neck to be forced into hyperextension as the seat pushes the person's torso forward—and the unrestrained head and neck fall backwards.

Despite advances in safety devices, neck injuries in traffic accidents, especially non-severe rear impact accidents, are still a serious and costly social problem. The high cost of whiplash injury has been extensively documented. The development of safety measures to reduce whiplash injuries has been the source of many research investigations. Most of these research projects tried to provide an understanding of head-neck kinematics during low energy rear-collisions. This led to the introduction of head restraints since the 1960's as a countermeasure to limit relative motion between the head and thorax, thereby reducing injuries.

However, the effectiveness of these devices in reducing automotive injury has been limited. This is thought to be caused by the incorrect position of the head restraint. The first generation (unadjustable) head restraints were not optimally placed considering human anthropometry to prevent relative head-neck motions although they may have enhanced head-neck relative motion during rear collision. After being introduced, adjustable head restraints were found usually not positioned correctly which made them inefficient. Besides, even when used in their optimal locations, they have a limited benefit in reducing injuries because their static behaviors are often not adapted to the occupants' head positions at the times of the impact events.

There is therefore a need for improved designs for the safety devices on vehicles.

SUMMARY OF THE INVENTION

The presently disclosure attempts to address the aforementioned limitations in conventional vehicle safety devices. The presently disclosed method is significantly more effective in reducing whiplash injuries than conventional safety devices.

In one aspect, the disclosed method seeks to reduce forces exerted on passenger's head during whiplash motions by minimizing the total angular acceleration and thus the angular displacement of the passenger's head. The sudden expansion of neck muscles and vertebrates are reduced by introducing a negative acceleration on the passenger's body. The negative acceleration is provided by a curved guide underneath the seat, which can generate a tangential and a normal acceleration in the passenger's head. Since the normal acceleration does not cause whiplash injury, the total original acceleration is reduced by the amount of this normal acceleration.

Moreover, an impact sensor can be mounted at the rear end of a vehicle, which, upon impact from behind, can activate the disclosed whiplash reducing device to allow the seat to rotate freely. When there is no rear impact, the seat returns to a normal position in which the seat is locked down and not allowed to rotate freely.

In one general aspect, the present invention relates to a vehicle safety device for reducing whiplash in a vehicle, which includes a curved guide configured to allow a seat to slide thereon; an impact sensor configured to detect an impact on a rear end of the vehicle; and a locking mechanism that can allow the seat to slide on the curved guide when an impact is detected by the impact sensor, wherein the locking mechanism can prevent the seat from moving relative to the curved guide when there is no impact detected by the impact sensor.

Implementations of the system may include one or more of the following. The vehicle safety device can further include a signal conditioning controller that can produce a control electric signal in response to detection of the impact by the impact sensor. The signal conditioning controller can produce the control electric signal having a waveform tailored to the vehicle. The signal conditioning controller can produce the control electric signal having a waveform tailored to properties of the impact. The signal conditioning controller can produce the control electric signal having a waveform tailored to properties of the passenger. The locking mechanism can lock the seat to the curved guide when there is no impact detected by the impact sensor. Tin the locking mechanism can include a locking pin that is configured to lock the seat to the curved guide when there is no impact detected by the impact sensor and to unlock the seat from the curved guide when there is an impact detected by the impact sensor. The locking mechanism can include a solenoid that can control movements of the locking pin in response to whether an impact is detected by the impact sensor. The vehicle safety device can further include balls between the seat and the curved guide, which allows the seat to freely slide on the curved guide.

These and other aspects, their implementations and other features are described in detail in the drawings, the description and the claims.

BRIEF DESCRIPTION OF THE DRAWINGS

FIGS. 7A-7D show comparisons of car speeds, car displacements, seat relative speeds, and seat relative displacements between a car without a whiplash control (solid lines)

and a car installed with the presently disclosed whiplash reducing device (dashed lines).

FIGS. 8A-8D show comparisons of passenger head angles, head angular accelerations, head horizontal accelerations, and head vertical accelerations between a car without a whiplash control (solid lines) and a car installed with the presently disclosed whiplash reducing device (dashed lines).

Figure 9A:
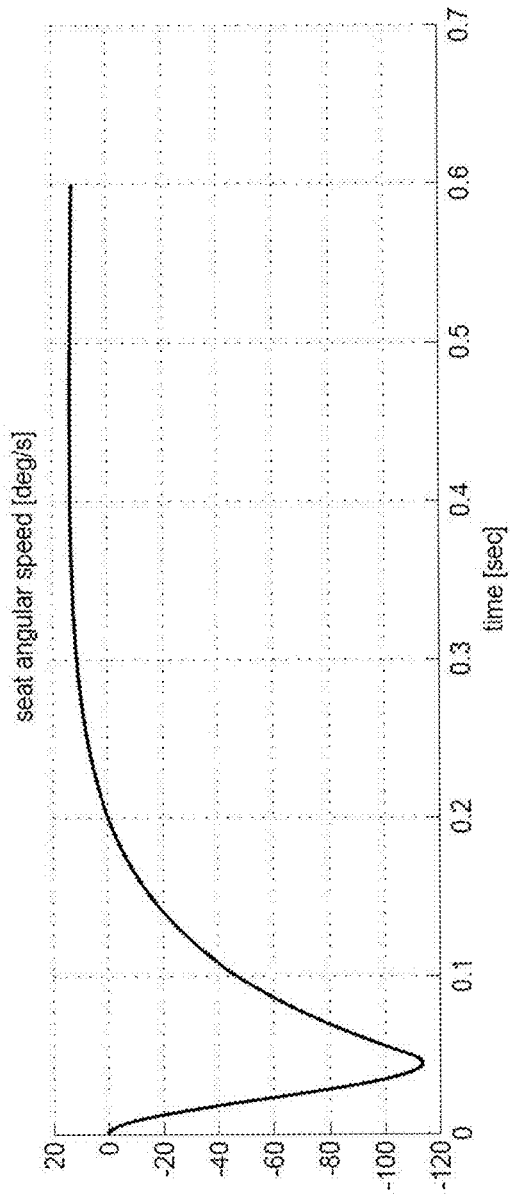
Figure 9B:
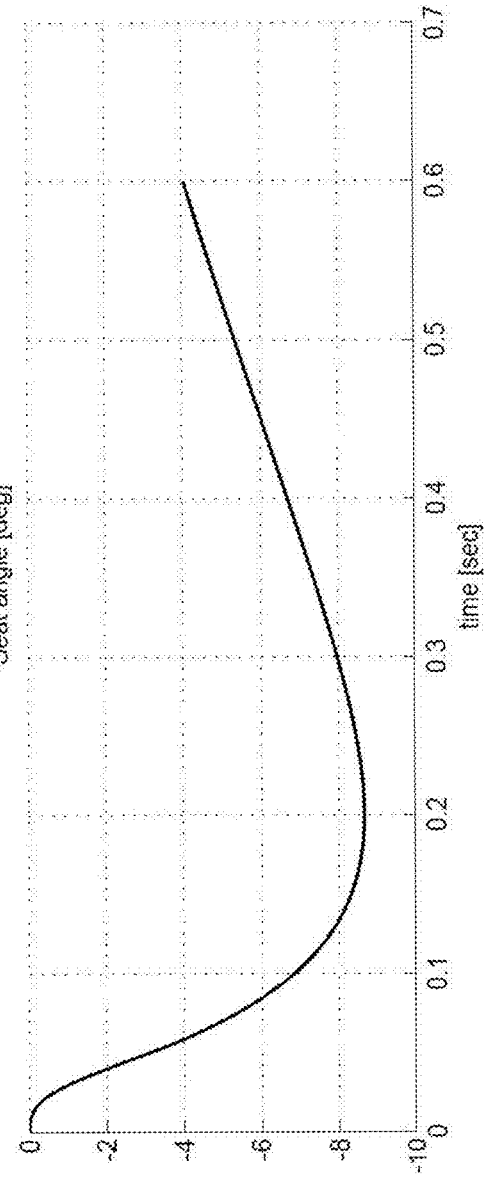

FIGS. 9A-9B show seat angles and angular speeds in a car installed with the presently disclosed whiplash reducing device.

DETAILED DESCRIPTION OF THE INVENTION

The presently disclosure aims to overcome drawbacks in the above described conventional car safety devices.

The whiplash mechanism is modeled using a linear spring and dampers to represent the head and neck of a human body sitting in a standing car. The movements of the head and the neck are caused by a rear impact to the standing car. Two cases have been modeled; a car seat without whiplash control mechanism; and a car seat installed with an invention whiplash control mechanism.

Figure 1:
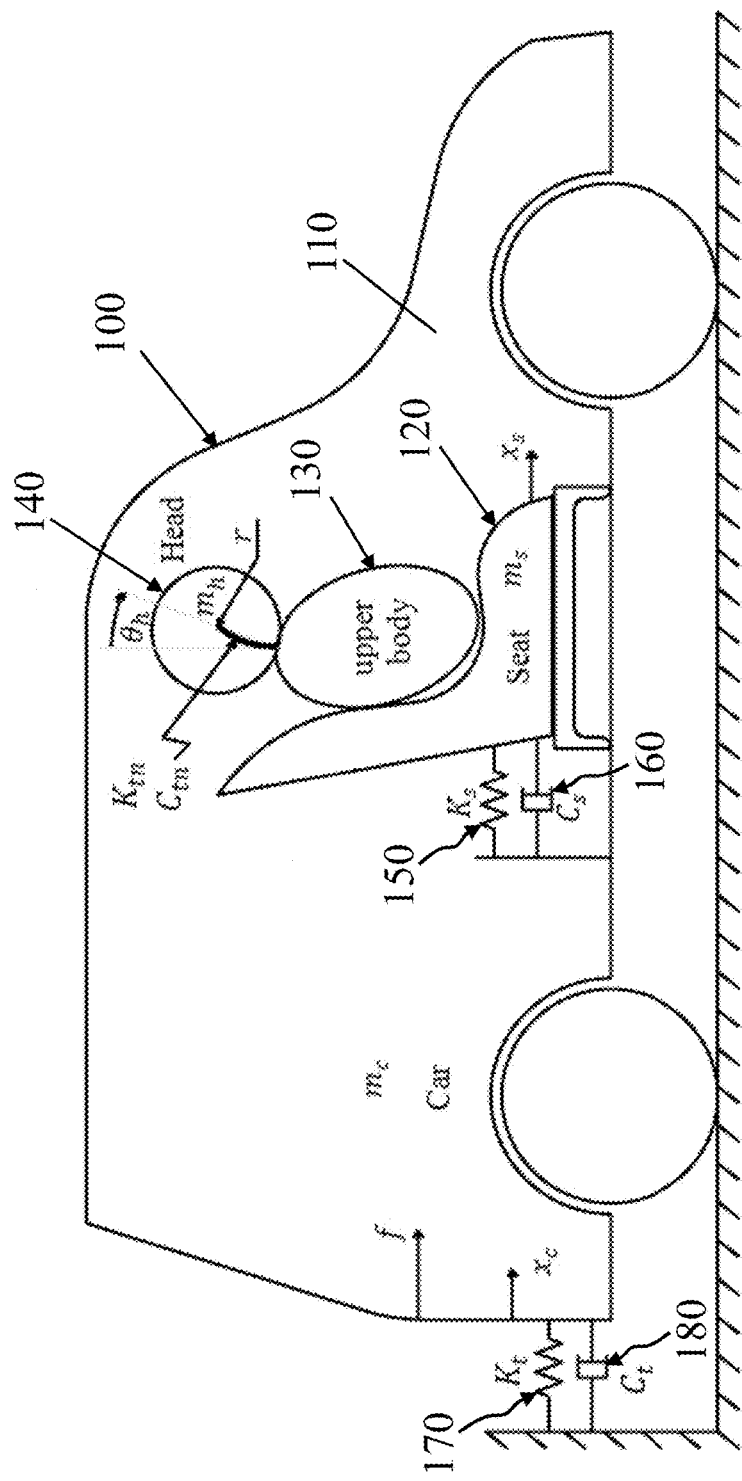
FIG. 1 is a schematic diagram illustrating a car without a whiplash control mechanism.

Referring to FIG. 1, a conventional car 100 without whiplash control includes simplified mass blocks for a car body 110, a seat 120, an upper body 130, a head 140, a seat spring 150, a seat damper 160, a tire spring 170, and a tire equivalent damper 180.

In the present disclosure, the conventional car without whiplash control and the vehicle installed with the invention whiplash reducing device are modeled.

The following parameters are chosen in simulations of the conventional car 100: the mass of the car 100: $m_c$=1400 kg; tire equivalent damper 180:

$$C_t = 20000 \; N \cdot \frac{s}{m};$$

tire equivalent spring 170:

$$K_t = 1\frac{N}{m};$$

the combined mass for the seat 120 and the upper body 130: $m_s$=100 kg; damping factor for the seat damper 160 $C_s$=100000 N.s/m; seat equivalent spring 150:

$$K_s = 100000 \; \frac{N}{m};$$

the neck length r=0.2 m; the mass of the head 140 $m_h$=3 kg; neck-head equivalent torsional damper $C_{tn}$=5 N·m·s/rad; neck-head equivalent torsional spring $K_{tn}$=20 N·m/rad.

Figure 3:
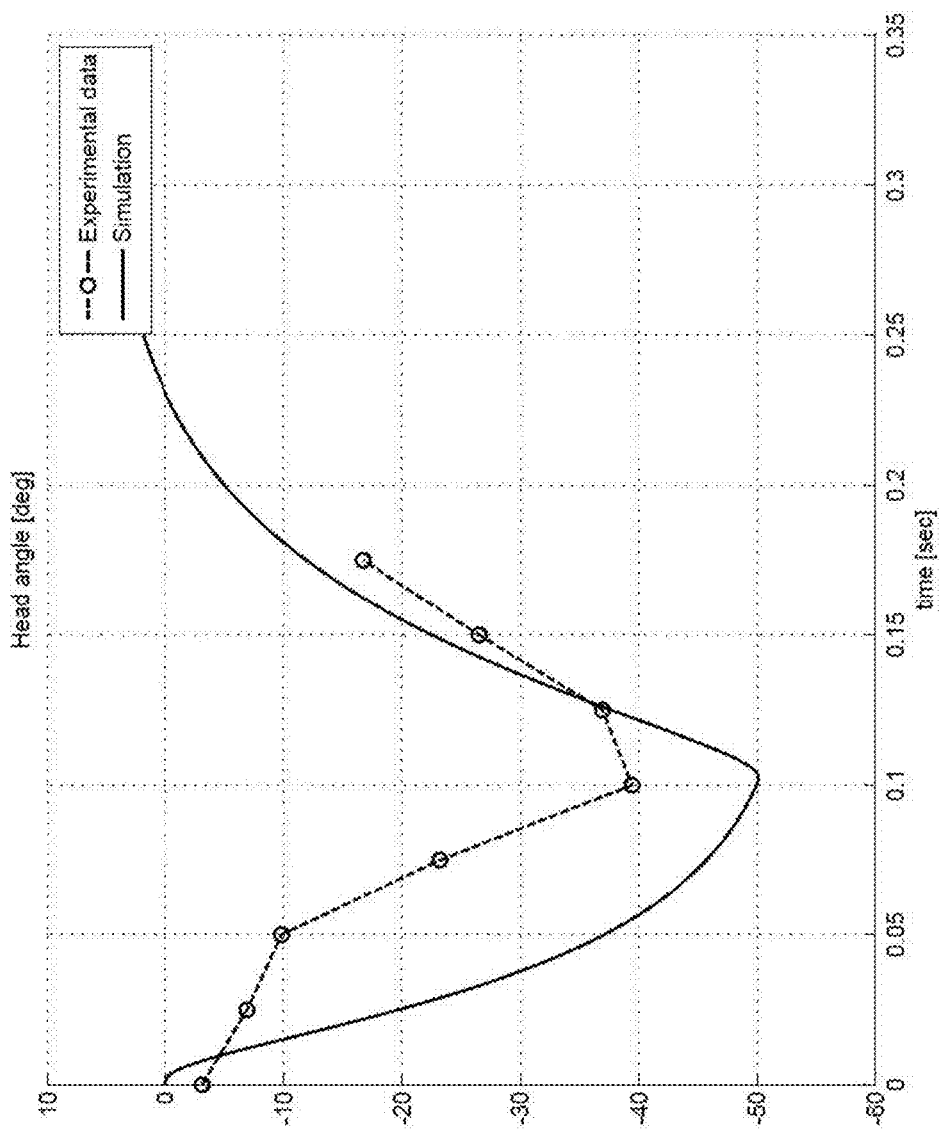
FIG. 3 shows experimentally measured and simulated head angles during a whiplash event in a vehicle without a whiplash control mechanism as shown in FIGS. 1 and 2.

The simulations are verified using experimental data. As shown in FIG. 3, the head angle and obtained from simulations shows a similar whiplash behavior to the data measured in the experiments.

Figure 4:
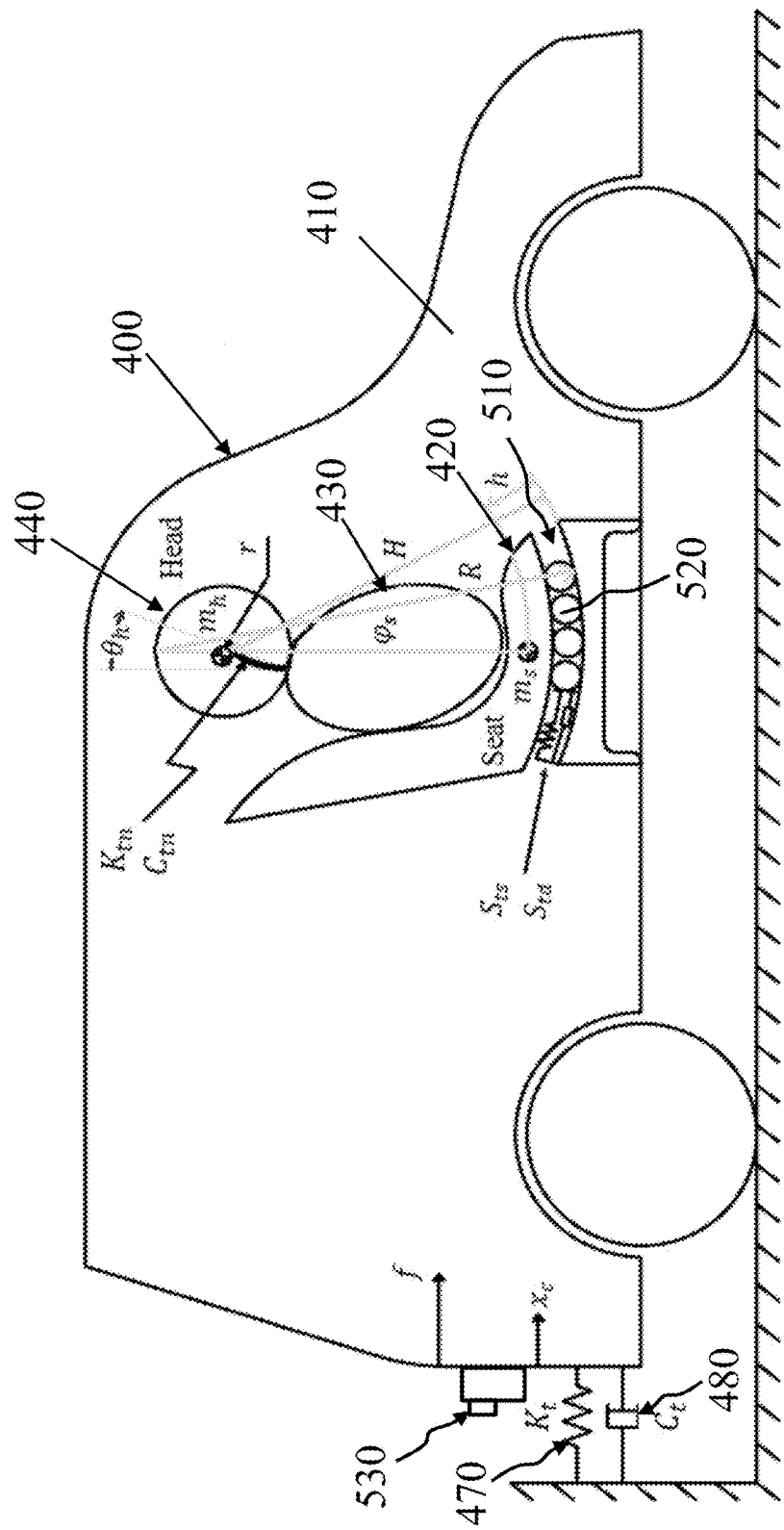
FIG. 4 is a schematic diagram illustrating a car installed with a whiplash reducing device in accordance with the present invention.
Figure 5:
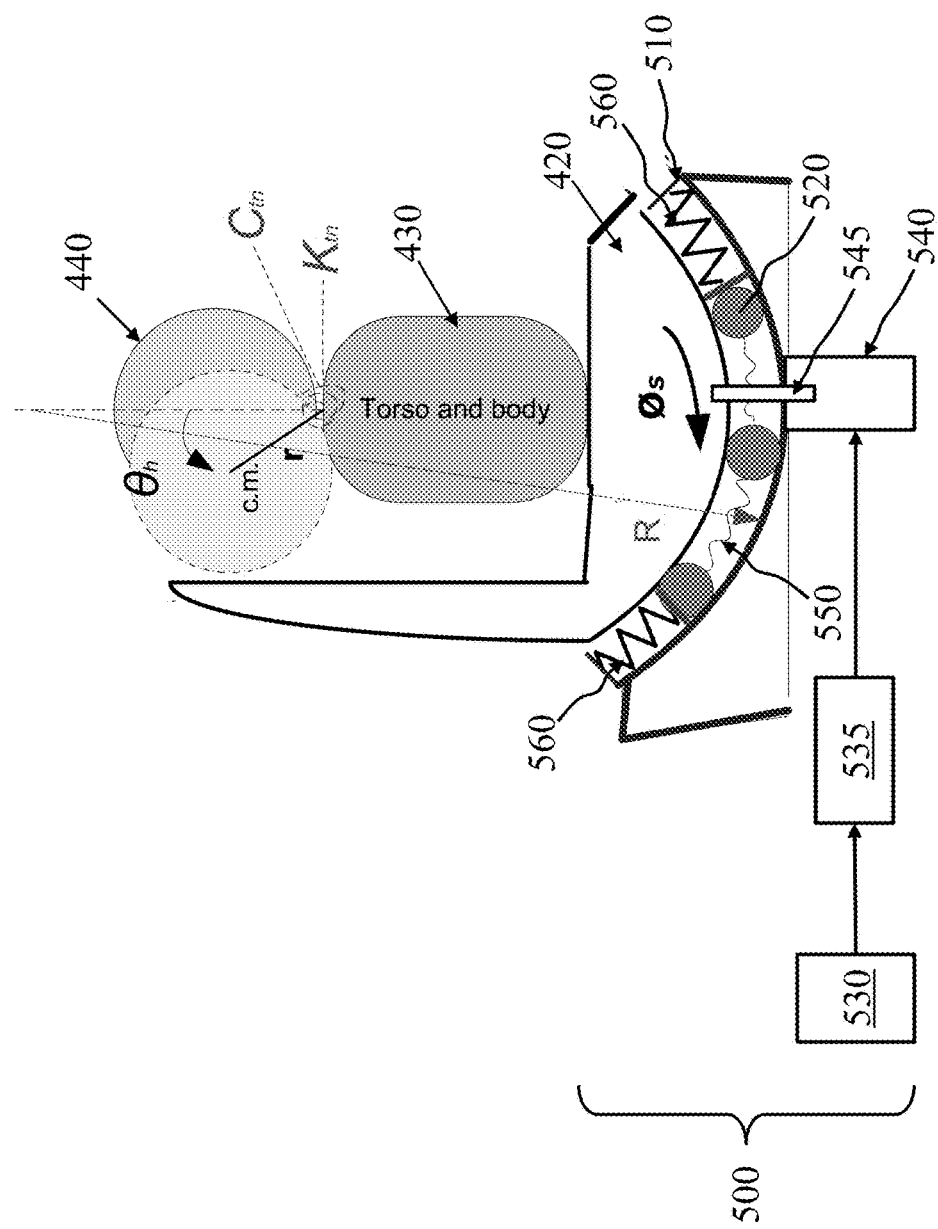
FIG. 5 is a detailed schematic diagram for the whiplash reducing device of FIG. 4.

Referring to FIGS. 4 and 5, a vehicle 400 in accordance with the present invention includes a vehicle body 410, a seat 420, an upper body 430, a head 440, a tire spring 470, and a tire equivalent damper 480. The vehicle 400 further includes a whiplash reducing device 500 which includes a curved guide 510, balls 520, an impact sensor 530, a signal conditioning controller 535, and a locking mechanism 540. The impact sensor 530 can be mounted on the rear bumper of the vehicle 400. The seat 420 is mounted on the curved guide 510 and with the seat's weight supported by the curved guide 510. The balls 520 are mounted between the seat 420 and the curved guide 510, which allow the seat 420 to glide along the curved guide 510. The locking mechanism 540 is in wired or wireless communication with the impact sensor 530. The locking mechanism 540 can include a locking pin 545 that is controlled by a solenoid (not shown) under the control of an electric voltage. Under the control of an electric signal, the locking pin 545 can be moved by the solenoid to a locking position to lock the seat 420 to the curved guide 510 or to an unlocked position to allow the seat 420 to move along the curved guide 510.

When an impact is detected by the impact sensor 530 due to a collision by another car at the rear end of the vehicle body 410, the impact sensor 530 sends a sensing electrical signal to a signal conditioning controller 535. In response, the signal conditioning controller 535 produces an control electric signal having a waveform that is tailored to the vehicle (weight, height, length, materials, configurations, etc.), the properties of impact (acceleration, direction, etc.), the passenger (weight and height, etc.) and sends the control electric signal to the locking mechanism 540. In response, the solenoid in the locking mechanism 540 unlocks the locking pin 545, which allows the seat 420 to slide on the curved guide 510. When there is no impact detected by the impact sensor 530, the solenoid moves the locking pin 545 into a locking position which secures the seat 420 to a sturdy position. The whiplash reducing device 500 also includes a seat torsional spring 550 and a seat torsional damper 560, which are used to optimize the dynamic response of the seat 420 and the passenger in response to the impact. As a result, whiplash is effectively reduced in the passenger's head 440 and the upper body 430. When there is no impact detected by the impact sensor 530, the locking mechanism 540 can lock the seat 420 to the curved guide 510, preventing it from moving relative to the curved guide 510.

The mass of the vehicle 400, the seat 420, the upper body 430, the head 440, the tire spring 470, and the tire equivalent damper 480 are simulated using the same parameters as their counterparts in FIG. 1 as described above. In addition, the following parameters for the whiplash reducing system 500:

Mass moment of inertia of the seat 420 and the upper human body 430 $J_s$=250 kg·m$^2$; seat torsional damping constant: $S_{td}$=900 N·m·s/rad; torsional stiffness of the seat torsional spring 550: $S_{ts}$=50 N·m/rad; the radius of the curved guide 510: R=2 m; the distance between head and seat sliding curve: H=0.8 m; the distance between seat and the curved guide 510: h=0.1 m.

Figure 6:
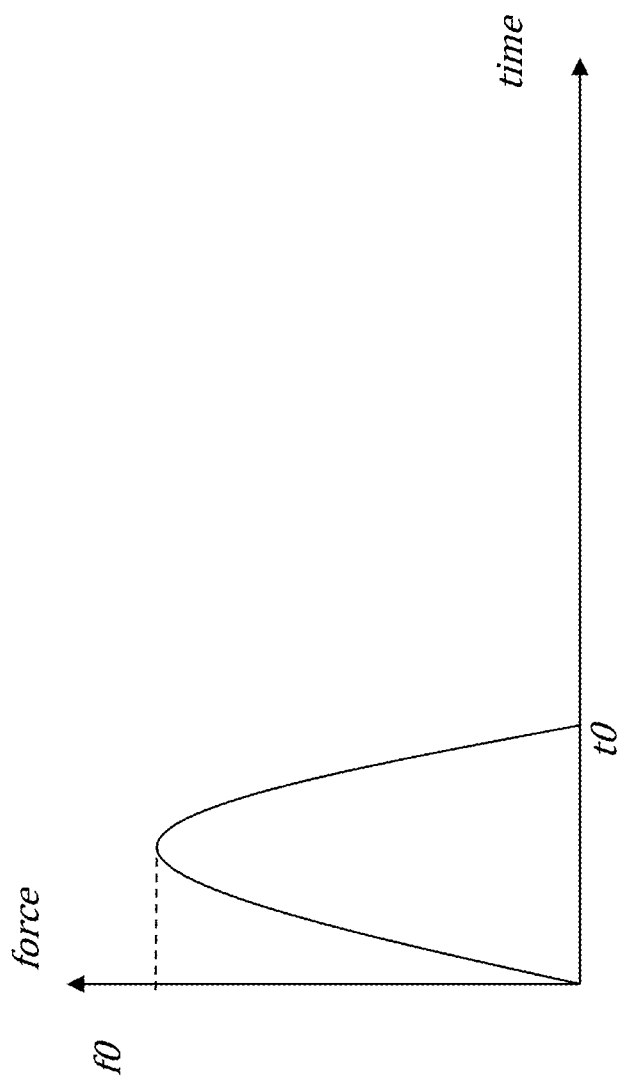
FIG. 6 illustrates a temporal force profile applied to a car without a whiplash control and a car installed with the presently disclosed whiplash reducing device.
Figure 8A:
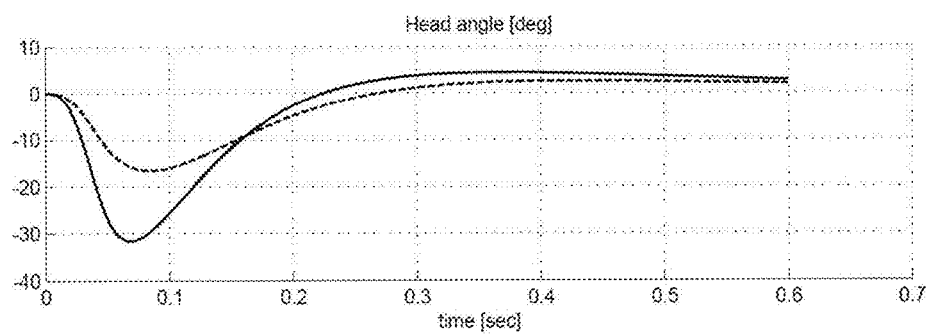
Figure 8B:
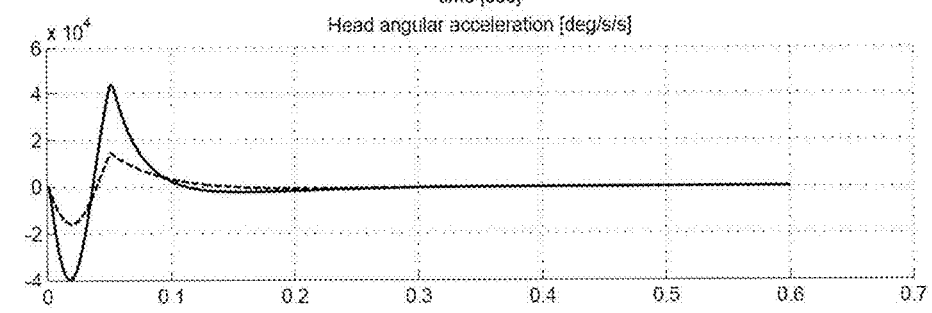
Figure 8C:
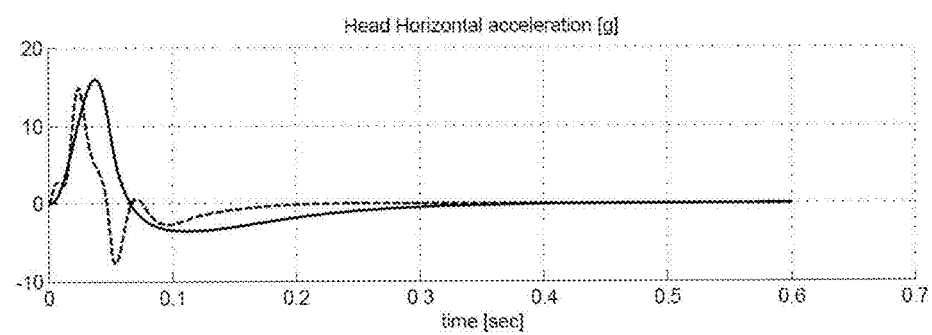
Figure 8D:
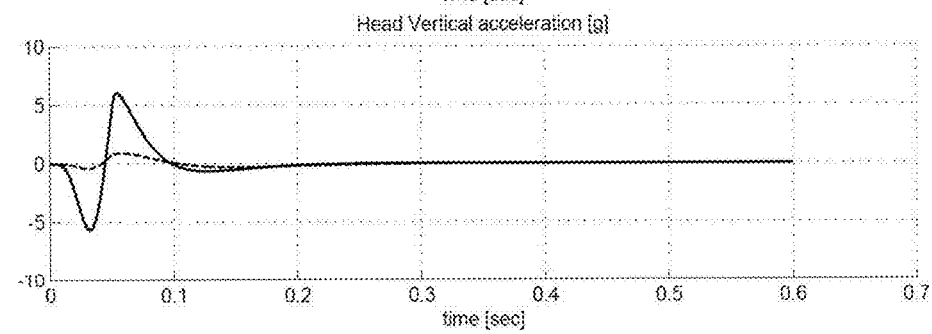

After solving the nonlinear equation of motion using Rung-Kutta technique, the car or vehicle, seat, head and neck motion are simulated using the following parameters: $f_0$=4(10)$^5$N, $t_0$=50 ms, where $f_0$, $t_0$ are the peak value and duration of a force applied to the rear end of the car or vehicle. As shown in FIG. 6, the force can approximately have the shape of half cycle of a sine curve.

Figure 2:
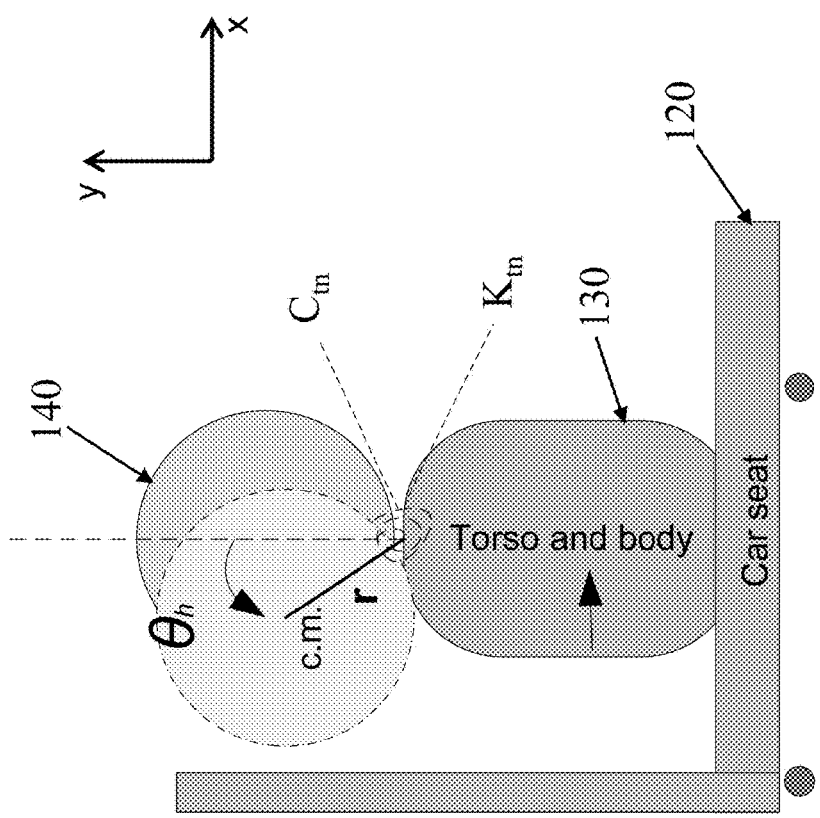
FIG. 2 is a detailed schematic diagram illustrating the car without a whiplash control mechanism in FIG. 1.

The simulation results for the conventional car (shown in FIGS. 1 and 2) and the vehicle installed with the whiplash reducing device (FIGS. 4 and 5) are compared in FIGS. 7A-8D. FIGS. 7A-7D show comparisons of car speeds, car displacements, seat relative speeds, and seat relative displacements between a car without a whiplash control (solid lines) and a car installed with the presently disclosed whiplash reducing device (dashed lines). While the car speeds and displacements are similar for the convention and invention vehicles, the seat speeds and displacements relative to the car are very different for the two systems. The disclosed whiplash reducing device has produced a significant negative movement (speed and displacement) in the seat relative to the vehicle body, which compensate the forward movement of the vehicle. While the vehicle displaced by a distance of 0.63 m, the maximum relative seat displacement relative to the vehicle body is 28 cm. The net effect of the disclosed whiplash reducing device is thus to drastically reduce the movement of the upper body and the head of the passenger.

FIGS. 8A-8D directly compare the impacts on the passengers between the conventional car (shown in FIGS. 1 and 2) and the vehicle installed with the whiplash reducing device (FIGS. 4 and 5). As shown, the invention vehicle (dashed lines) have much smaller magnitudes in passenger head angle, head angular acceleration, head horizontal acceleration, and head vertical acceleration than those in a conventional car without a whiplash control (solid lines). The maximum head angular acceleration is reduced from $4.4 \times 10^4$ deg/s$^2$ in the conventional car to $1.44 \times 10^4$ deg/s$^2$ in the invention vehicle. The maximum head linear acceleration in the horizontal direction is reduced from 16 g and reduced to 14.9 g.

Referring to FIGS. 9A-10B, the seat 420 has moved along the curved guide 510 by a maximum of −8.5 degrees (i.e. backward motion relative to the forward impact on the rear-end of the vehicle).

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the disclosed safety mechanism or device is applicable to many types of vehicles such as cars, buses, trucks, etc. The parameters of the various components in the vehicles are not limited to those used in the simulations described. Moreover, the disclosed whiplash reducing device is suitable to work in conjunction with many other types of seat safety devices such as seat belt and should straps.

What is claimed is:

1. A vehicle safety device for reducing whiplash in a vehicle, comprising:
    a curved guide configured to allow a seat to slide thereon;
    an impact sensor configured to detect an impact on a rear end of the vehicle and to produce a sensing signal;
    a locking mechanism configured to lock the seat to the curved guide when there is no impact detected by the impact sensor, wherein the locking mechanism is configured to unlock the seat to allow the seat to slide on the curved guide after the sensing signal is produced by the impact sensor; and
    a seat torsional damper coupled to the seat to damp the seat's movement.

2. The vehicle safety device of claim 1, further comprising:
    a signal conditioning controller configured to produce a control electric signal in response to the sensing signal from the impact sensor, wherein the locking mechanism is configured to unlock the seat in response to the control electric signal.

3. The vehicle safety device of claim 2, wherein the control electric signal has a waveform tailored to the vehicle.

4. The vehicle safety device of claim 2, wherein the control electric signal has a waveform tailored to properties of the impact.

5. The vehicle safety device of claim 2, wherein the control electric signal has a waveform tailored to properties of the passenger.

6. The vehicle safety device of claim 2, wherein the signal conditioning controller produces the control electric signal to limit the seat's angular displacement along the curved guide to be smaller than 8.5 degrees after the sensing signal is produced by the impact sensor.

7. The vehicle safety device of claim 1, wherein the locking mechanism comprises:
    a locking pin that locks the seat to the curved guide when there is no impact detected by the impact sensor and unlocks the seat to allow the seat to slide on the curved guide after the sensing signal is produced by the impact sensor.

8. The vehicle safety device of claim 7, wherein the locking mechanism comprises:
    a solenoid configured to control movements of the locking pin between a lock position and an unlock position in response to whether the sensing signal is produced by the impact sensor.

9. The vehicle safety device of claim 1, further comprising:
    balls between the seat and the curved guide, which allow the seat to slide on the curved guide when the seat is unlocked by the locking mechanism.

10. The vehicle safety device of claim 9, wherein the seat torsional damper damps movements of the balls.

11. The vehicle safety device of claim 9, further comprising:
    one or more seat torsional springs configured to provide torsional stiffness to the seat's movement.

12. The vehicle safety device of claim 11, wherein each of the one or more seat torsional spring is coupled between two of the balls between the seat and the curved guide.

* * * * *